Oct. 2, 1945.  J. HELFENSTEIN  2,385,986
FISHING LURE
Filed June 13, 1944
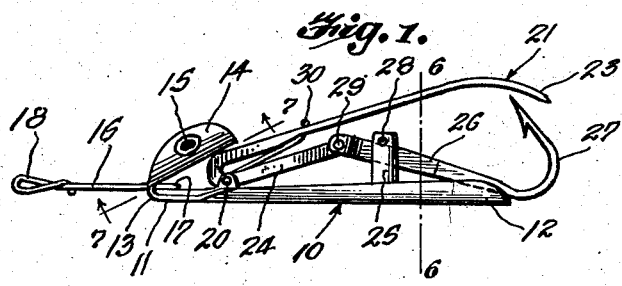
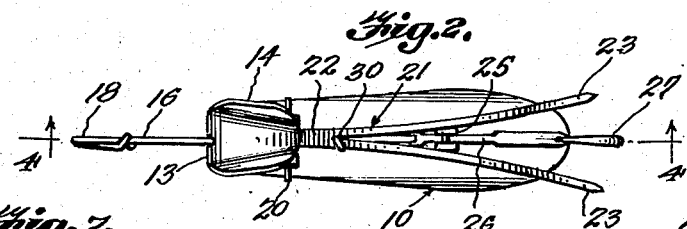
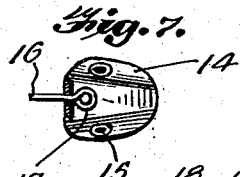
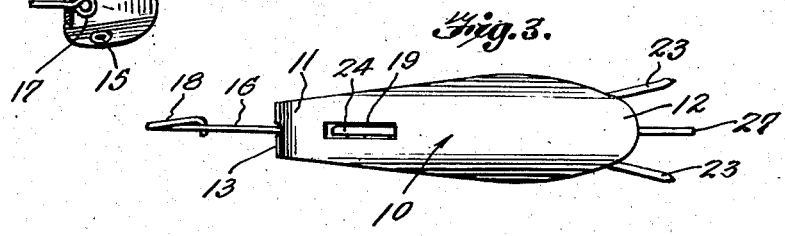
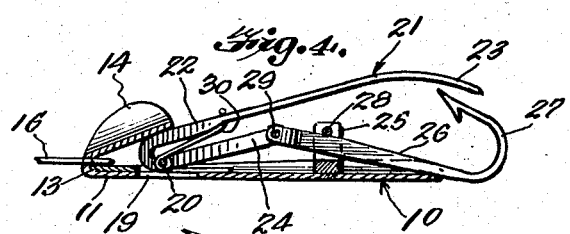
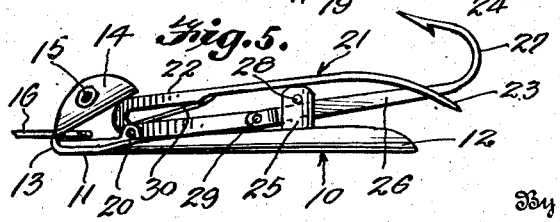
Inventor
JOHN HELFENSTEIN
By Wilfred E. Lawson
Attorney Patented Oct. 2, 1945

2,385,986

UNITED STATES PATENT OFFICE 2,385,986

FISHING LURE

John Helfenstein, Minneapolis, Minn.

Application June 13, 1944, Serial No. 540,036

6 Claims. (Cl. 43—39)

This invention relates generally to the class of fishing and trapping and pertains particularly to improvements in fish attracting and hooking devices or lures.

A principal object of the present invention is to provide a fishing lure of the so-called weedless type, wherein there is provided a hook and a weed guard or deflector having novel mounting means whereby relative movement is permitted between the hook and the weed guard which causes the hook to be shifted into snaring position when the weed guard is caused to shift under the action of a fish taking the lure in its mouth.

Another object of the invention is to provide a fishing lure comprising a spoon, a hook pivotally mounted on the spoon and a weed guard pivotally mounted on the spoon and pivotally coupled with the hook in such manner that when the spoon is struck by a fish so that its rear end is taken in the fish's mouth together with the weed guard, the hook is caused to shift into hooking engagement with the jaw of the fish.

Another object of the invention is to provide a fishing lure of the character stated, wherein the weed guard is connected with the spoon in such a manner that the guard will maintain its position while being cast and while the spoon is drawn through the water, the shifting of the guard for the exposure of the hook point being possible only upon the application of positive pressure against the guard toward the spoon body to which the guard is pivotally connected.

Still another object of the invention is to provide a fishing lure of the character stated, having a novel head end formation which causes the lure to resemble or simulate an insect.

The invention will be best understood from a consideration of the following detailed description taken in conjunction with the accompanying drawing forming a part of the present application, with the understanding, however, that minor changes and modifications may be made in the invention so long as such changes or modifications do not depart materially from the invention as expressed in the appended claims.

In the drawing:

Figure 1 is a view in side elevation of the device embodying the present invention.

Figure 2 is a bottom plan view of the same.

Figure 3 is a top plan view of the device.

Figure 4 is a longitudinal section taken on the line 4—4 of Figure 2.

Figure 5 is a view in side elevation of the device showing said guard depressed and the hook projected.

Figure 6 is a transverse section on the line 6—6 of Figure 1.

Figure 7 is a section on the line 7—7 of Figure 1.

Referring now more particularly to the drawing, the numeral 10 generally designates the body of the lure which is in the form of the conventional and well-known fishing spoon. This spoon, as is common with such devices, is relatively long and is of gradually increasing width from its forward end which is designated 11, to its rear end 12 and in addition to being rounded at its rear end, it is slightly transversely arcuate through the major portion of its length, the greatest degree of convexity being adjacent the rear end.

In accordance with the present invention the forward end 11 of the spoon body is extended and bent or turned back to form the neck 13 and this merges into the short rearwardly directed head portion 14 which is also slightly transversely arcuate, the top or convex side of the head being directed upwardly toward the under or concave side of the spoon body 10. In order that the head may more naturally simulate that of an insect or small animal each curved side thereof has an eye 15 painted or otherwise suitably formed thereon.

Formed through the center of the neck 13 upon the longitudinal center of the spoon is a suitable aperture to receive the wire pin 16, the rear end of which is formed in the eye 17 to prevent it from passing through the aperture, not shown, while the forward end is suitably looped or otherwise formed as at 18 to facilitate the attachment of a fishing line thereto.

The body of the lure spoon 10 is formed with the longitudinal opening 19, which is located on the longitudinal center and adjacent the forward or head end of the spoon and secured to the underside of the spoon to extend across the forward end of this opening, is a pivot pin 20.

The numeral 21 generally designates the weed guard or deflector. This deflector or weed guard is preferably formed in a single piece or body and comprises the relatively long lower portion 22 having the rearwardly diverging longitudinally arcuate fingers 23, and the shorter lever arm 24 which forms an integral part of the body 22 and overlies the same as illustrated.

The guard is pivotally mounted upon the pin 20 at the point of connection between the body 22 and the lever arm 24 so that the arm 24 lies adjacent the slot or opening 19 while the guard body extends downwardly and rearwardly in a long sweeping curve, with respect to the underside of the spoon. The fingers of the guard also curve or extend laterally as shown in Figure 2.

Rearwardly of the slot 19 there is secured to the underside of the spoon, upon the longitudinal center thereof, the depending post 25 which is slotted to receive the shank portion 26 of the fishing hook 27. A pivot pin 28 passes through the post and across the shank 26, upon the side of the shank remote from the inner end of the slot and adjacent to the end of the shank remote from the hook proper. This pin retains the shank in the slot for free swinging or rocking movement so that the hook may oscillate in a plane extending through the longitudinal center of the spoon body.

The free end of the hook shank 26, forwardly of the post 25, is pivotally attached as at 29, to the free rearward end of the weed guard lever arm 24.

Supported upon the pivot pin 20 is a spring 30, one end of which bears against the underside of the spoon while the other end bears against the body 22 of the weed guard. This spring functions to normally urge the weed guard away from the underside of the spoon and consequently this causes the corresponding oscillation of the arm 24 away from the body of the spoon so as to oscillate the hook to move the back part of the hook toward the curved underside of the spoon body. Thus when the hook and weed guard have been oscillated in the manner stated under the action of the spring 30 the point of the hook will be located within the space between the fingers of the weed guard and the underside of the spoon and consequently when the lure is drawn through weeds or other material in the water such material will be deflected away from the hook point and the latter will remain clean and the lure cannot become fouled or snagged.

When a fish strikes the lure and takes the same in its mouth the closing of the jaws will swing the weed guard in toward the underside of the spoon. This will cause an oscillation of the hook upon the pivot 28 so as to project the point of the hook downwardly between the fingers of the weed guard where it may readily engage in the jaw of the fish.

I claim:

1. A fishing lure, comprising a body adapted to have a line attached thereto, a hook member mounted upon one side of the body, a weed deflector supported upon the said one side of the body for movement relative thereto and normally arranged with the point of said hook between the deflector and the said one side of the body, and an operative coupling between the weed deflector and the hook which is so constructed and arranged that upon oscillation of the weed deflector toward the said one side of the body the point of the hook will be extended to the side of the weed deflector remote from the said one side of the body.

2. A fishing lure, comprising an elongated body, a relatively long weed deflecting element pivotally attached at an intermediate point on its length to one side of the body and having one end normally spaced from the said one side of the body, a fish hook having a relatively long shank, means forming a connection between said shank and said one side of the body between the body and the weed deflector facilitating oscillation of the hook, a pivot connection between said hook shank and the said one end of the weed deflector whereby upon oscillation of the deflector toward the said one side of the body said hook will be oscillated to project its point beyond the deflector, and resilient means normally maintaining said weed deflector in guarding relation with the hook point.

3. A fishing lure, comprising a relatively long body, means at one end of the body for attaching a line thereto, a weed deflector comprising a relatively long member formed at one end to provide two divergently related fingers, a pivotal connection between the weed deflector member and one side of the body adjacent one end of the latter, an arm integral with the deflector member to oscillate therewith relative to the body, a hook having a relatively long shank, a mounting for said hook shank upon the said one side of the body facilitating oscillation of the hook, and a pivotal connection between the free end of the hook shank and the said arm, said weed deflector member normally having a spaced relation with the said one side of the body, the hook being disposed in the space between the body and the deflector fingers, the oscillation of the deflector toward the body effecting the oscillation of the hook and the projection of the hook point between the fingers to the side of the deflector remote from the body.

4. A fishing lure as set forth in claim 3, and spring means normally urging oscillation of the weed deflector away from said body.

5. A fishing lure of the character stated, comprising a relatively long slightly transversely arcuate plate having a rearwardly directed head at one end, a pivot carried by the plate on the side of the plate toward the head, a relatively long weed deflector member having a reverted lever arm at one end connected to the pivot, said lever arm being disposed between the member and the plate, said member at its other end being formed to provide a pair of divergently related guard fingers, a hook having a relatively long shank, means oscillatably coupling the free end of the shank to the plate, a pivotal connection between the free end of the shank and said lever arm, said hook having its point in the space between the fingers and the plate when the fingers are at the limit of their movement from the plate, the hook having its point moved outwardly between the fingers and away from the plate when the fingers are oscillated toward the plate.

6. A fishing lure of the character set forth in claim 5, and spring means carried upon said pivot and engaging between the plate and the weed deflector member to normally urge the deflector fingers outwardly away from the plate.

JOHN HELFENSTEIN.